(12) United States Patent
Koelemij et al.

(10) Patent No.: US 12,182,270 B2
(45) Date of Patent: Dec. 31, 2024

(54) CYBERSECURITY HAZARD ANALYSIS TOOL

(71) Applicant: Honeywell International Inc., Charlotte, NC (US)

(72) Inventors: Sinclair Howard Koelemij, Velsen-Zuid (NL); Sema Tutucu, Amsterdam (NL)

(73) Assignee: Honeywell International Inc., Charlotte, NC (US)

( * ) Notice: Subject to any disclaimer, the term of this patent is extended or adjusted under 35 U.S.C. 154(b) by 262 days.

(21) Appl. No.: 17/478,066

(22) Filed: Sep. 17, 2021

(65) Prior Publication Data

US 2022/0405398 A1 Dec. 22, 2022

Related U.S. Application Data

(60) Provisional application No. 63/084,223, filed on Sep. 28, 2020.

(51) Int. Cl.
*G06F 21/57* (2013.01)
*G06F 21/55* (2013.01)

(52) U.S. Cl.
CPC .......... *G06F 21/577* (2013.01); *G06F 21/552* (2013.01); *G06F 2221/034* (2013.01)

(58) Field of Classification Search
CPC . G06F 21/577; G06F 21/552; G06F 2221/034
See application file for complete search history.

(56) References Cited

U.S. PATENT DOCUMENTS

2018/0103058 A1* 4/2018 St. Pierre ............ H04L 63/1441
2021/0234882 A1* 7/2021 Lee .................... H04L 63/1441

FOREIGN PATENT DOCUMENTS

CN 108696534 A * 10/2018 ............ H04L 41/145
CN 111641596 A * 9/2020 .......... G06Q 10/0635

OTHER PUBLICATIONS

A Kannagi • Pavan Chaudhary • Muthupandi G; Evaluative Analysis of Secure approaches in Simulated Real-World Contexts; 2023 IEEE International Conference on ICT in Business Industry & Government (ICTBIG) (2023, pp. 1-6); (Year: 2024).*

(Continued)

*Primary Examiner* — Roderick Tolentino
*Assistant Examiner* — Chao Wang
(74) *Attorney, Agent, or Firm* — John Maldjian, Esq.; Stevens & Lee PC

(57) ABSTRACT

A method includes providing a cybersecurity risk model for cybersecurity and process risk modeling of assets in an industrial control system (ICS) including process controllers connected together by a communications network coupled by I/O devices to field devices coupled to processing equipment. The assets are configured together to implement a process. The risk model processes input data including event path data including event paths leading to a cybersecurity hazard and ≥1 process hazard, exposure data for the cybersecurity and process hazard, and consequence data for the cybersecurity and the process hazard including a severity of failure, the risk model outputting functional consequences of failure of the cybersecurity and the process hazard, and a likelihood of failure for the hazards. A risk analysis engine processes the functional consequences and likelihood of failures for the cybersecurity and process hazard, and generates outputs including a quantified risk for the cybersecurity and process hazard.

16 Claims, 14 Drawing Sheets

(INITIAL RISK ASSESSMENT)

(PERIODIC RISK ASSESSMENT)

(56) References Cited

OTHER PUBLICATIONS

Uchenna Daniel Ani • Hongmei He • Ashutosh Tiwari; Vulnerability-Based Impact Criticality Estimation for Industrial Control Systems; 2020 International Conference on Cyber Security and Protection of Digital Services (Cyber Security) (2020, pp. 1-8); (Year: 2020).*
Ensar Seker • Weizhi Meng; XVRS: Extended Vulnerability Risk Scoring based on Threat Intelligencel; 2023 IEEE International Conference on Metaverse Computing, Networking and Applications (MetaCom) (2023, pp. 516-523); (Year: 2023).*
Davis et.al., "A Cyber-Physical Modeling and Assessment Framework for Power Grid Infrastructures"; IEEE Transactions on Smart Grid, vol. 6, No. 5, Sep. 1, 2015, pp. 2464-2475 (12 pages total).
Cherdantseva et.al., "A review of cyber security risk assessment methods for SCADA systems", Computers & Security, vol. 56 (2016) pp. 1-27 (27 pages total).
Extended European Search Report mailed Feb. 18, 2022 issued in connection with corresponding EP Application No. 21199011.4 (7 pages total).

* cited by examiner

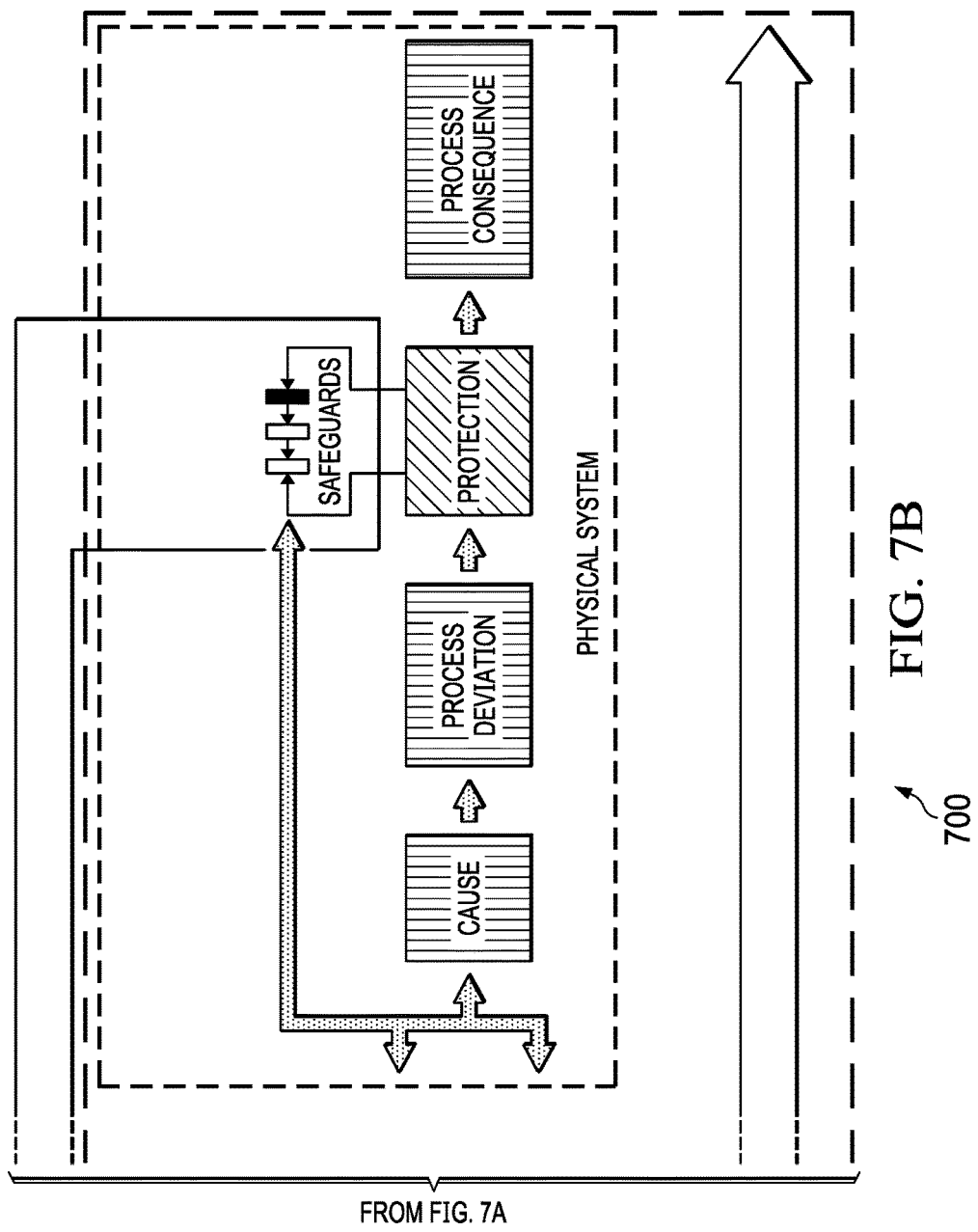

CYBERSECURITY HAZARD ANALYSIS TOOL

CROSS REFERENCE TO RELATED APPLICATIONS

This application claims the benefit of Provisional Application Ser. No. 63/084,223 entitled "CYBERSECURITY HAZARD ANALYSIS TOOL", filed on Sep. 28, 2020, which is herein incorporated by reference in its entirety.

FIELD

This Disclosure relates to cybersecurity for networked control systems.

BACKGROUND

There is a recognized need for securing critical infrastructure and protecting an Industrial Control Systems (ICS) that may also be called a "process control and automation system". Operational Technology (OT) has converged with information technology (IT), resulting in the increased need for OT cybersecurity. Connectivity of OT to the Internet improves the monitoring and/or controlling of physical devices, processes, and events such as for an ICS, including for Supervisory Control and Data Acquisition (SCADA) systems. However, opening network communications to OT comes with its challenges, including challenges for maintaining cybersecurity for the network and its connected systems.

There is known to be a difference between risk management and risk modelling. Risks are the potential effects of events that are caused by threats. Accordingly, risk modeling is a preliminary step in a risk assessment to determine what the respective threats might be.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects include a cybersecurity method and a cybersecurity hazard analysis tool. The method comprises providing a cybersecurity risk model configured for cybersecurity risk and process risk modeling of a plurality of assets configured in an ICS. The assets of the ICS comprises a plurality of computers including process controllers connected together by at least one communications network coupled by input/output (I/O) devices to field devices including sensors and actuators that are coupled to processing equipment, where the assets are configured together to implement a process involving at least one tangible material. The risk model processes input data including event path data comprising a plurality of event paths each leading to a cybersecurity hazard, at least one process hazard, exposure data for the cybersecurity hazards and the process hazard, and consequence data for the cybersecurity hazards and the process hazard including a failure mode severity.

The risk model outputs functional consequences of a failure for each of the cybersecurity hazards and the process hazard, and a likelihood of failure for each of the cybersecurity hazards and the process hazard. A risk analysis engine is for processing the functional consequences and the likelihood of failures for the cybersecurity hazards, and for the process hazard, and generating outputs including a quantified risk for each of the cybersecurity hazards and the process hazard.

The risk analysis engine can further process cybersecurity countermeasures that can reduce a likelihood of a successful cyberattack. Example countermeasures can include an antivirus engine, firewall, attack surface reduction, and process safeguards that reduce a severity of the cyberattack. Examples of process safeguards include eliminating the consequence using a data diode to eliminate any possible inbound traffic, and using hardwired connections between the process controllers and a programmable logic controller (PLC) to eliminate the use of the MODBUS protocol for write access. MODBUS is a known method used for transmitting information over serial lines between electronic devices.

BRIEF DESCRIPTION OF THE DRAWINGS

FIGS. 7A and 7B depict an example event path.

DETAILED DESCRIPTION

Figure 1A:
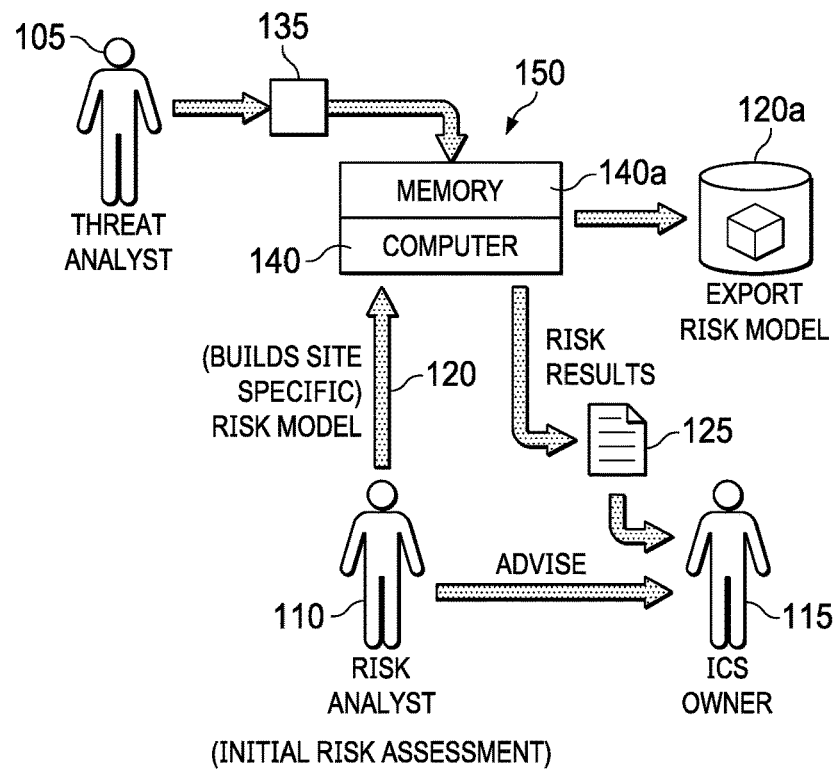
FIG. 1A and FIG. 1B depict an example use scenario for a disclosed cybersecurity hazard analysis tool implemented on a stand-alone laptop computer, according to an example aspect.

Disclosed aspects are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed aspects.

As used herein an ICS runs an industrial process involving a tangible material that disclosed aspects apply. For example, oil and gas, chemical, beverage, pharmaceutical, pulp and paper manufacturing, petroleum processes, electrical power including renewable energy, and water. Disclosed aspects are applicable to at least the following distinct applications described below.

A stand-alone cybersecurity hazard analysis tool version can be used by consultants to analyze OT cybersecurity risk and process risk, where the difference between these respective risk types are explained below. The stand-alone cybersecurity hazard analysis tool can comprise a cloud version without a connection to the ICS, or a cloud version with a communicable connection to the ICS.

Figure 1B:
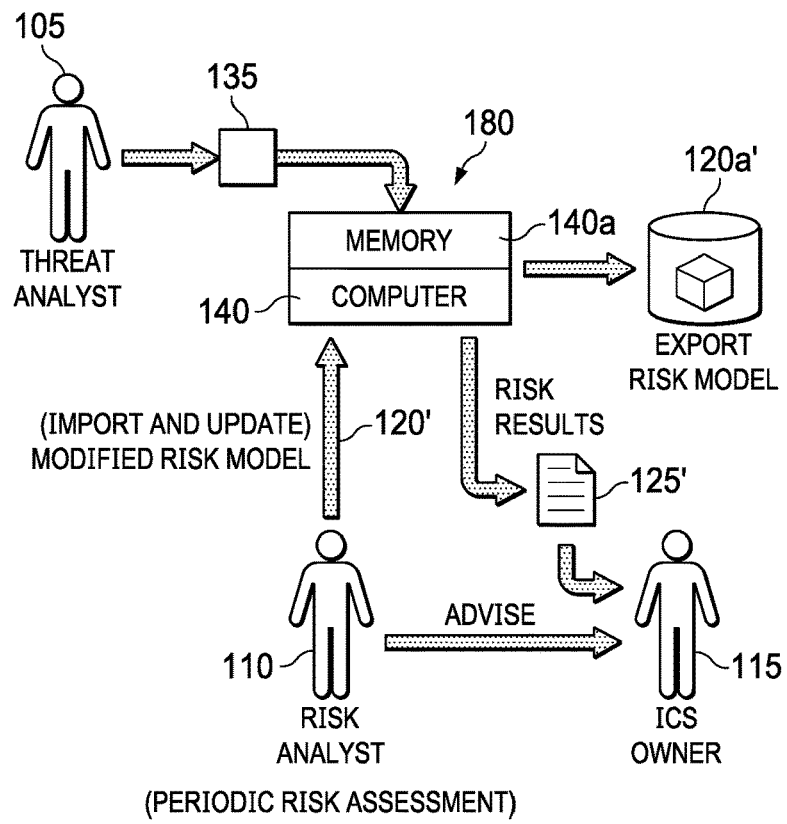

FIGS. 1A and 1B depict an example cybersecurity hazard analysis tool use scenario implemented on a stand-alone laptop computer, according to an example aspect. An initial risk assessment flow for generating a risk model application 150 is shown in FIG. 1A, and FIG. 1B which depicts a periodic risk assessment flow for generating a modified risk model application 180. These respective applications 150 and 180 are shown run on a computer 140 that can be a standalone computer, shown having a memory 140a. A central threat analyst(s) 105 that is an individual that generally maintains the attack and defense scenario information of the cybersecurity hazard analysis tool application, by adding new attack scenarios/event paths, and updating this information if the defense scenarios change and would otherwise become less effective.

Consultant(s) are shown as a risk analyst 110 who from a central set of attack and defense scenarios generally maintained by the threat analyst 105 which are generally stored in a data repository shown as 135, builds a risk model 120 for a risk model application 150. The risk analyst 110 imports an updated risk model 120' for the modified risk model application 180 shown in FIG. 1B, where the respective risk models 120, 120' are both site-specific by selecting the functions/equipment/protocols/data flow in use at an ICS owner's 115 ICS installation and configuring information that determines the site-specific cybersecurity exposure of the assets of the ICS to cyberprotect. The risk model 120 or modified risk model 120' as shown can be exported shown as export risk model 120a and 120a', respectively, as well as imported, to allow risk model modeling over a period of time based on new attack and defense scenarios or changed installations, shown being provided as risk results 125 for risk model application 150 and 125' for risk model application 180, shown being provided to the ICS owner 115.

Figure 2:
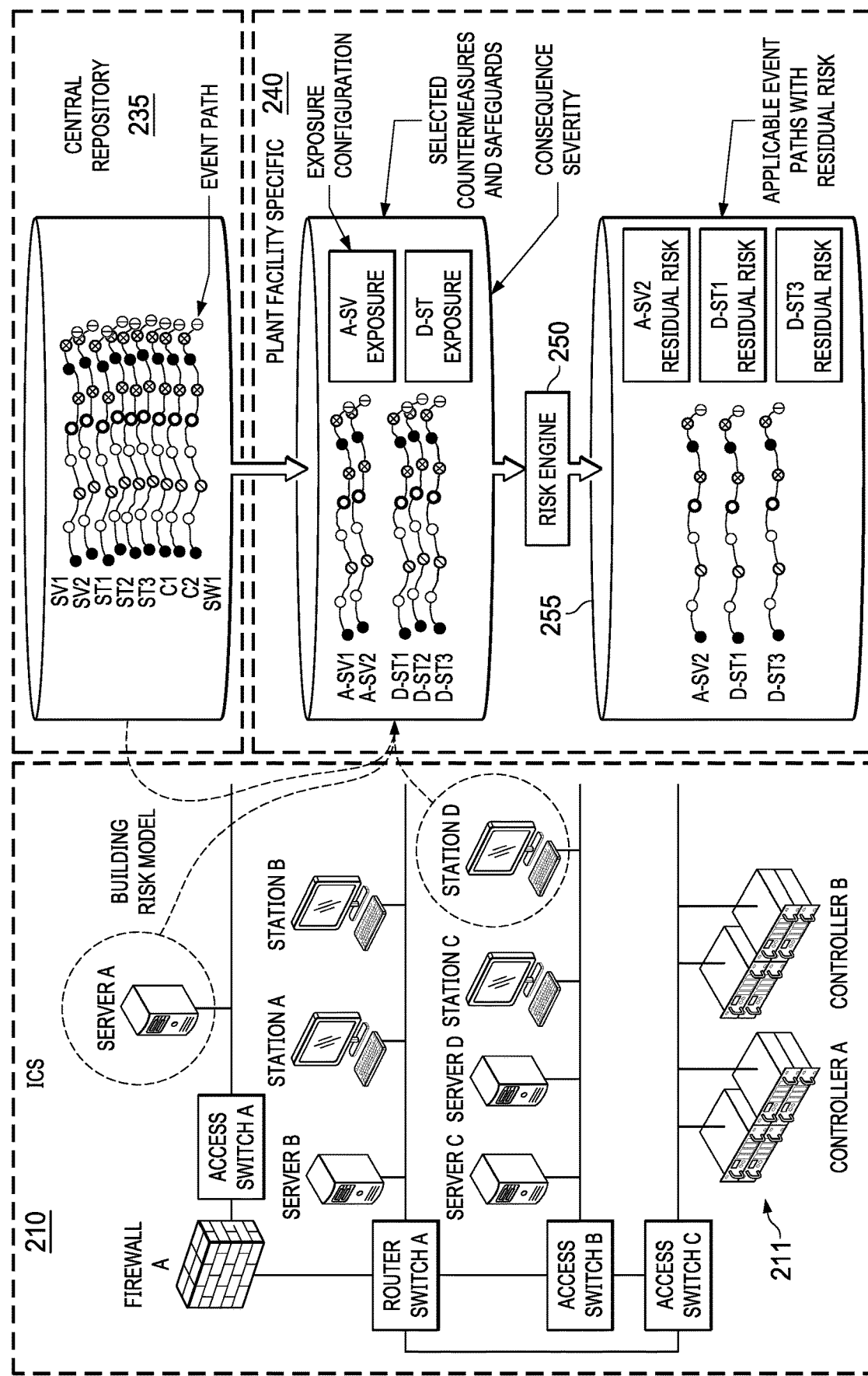
FIG. 2 depicts cybersecurity risk modelling for an ICS, according to an example aspect.

FIG. 2 depicts risk modelling for an ICS 210, according to an example aspect. The ICS 210 is shown as an ICS portion including plant levels down to a process controller level 211 shown comprising process controllers A and B that are coupled by access switch C then router switch A to firewall A, then access switch A to server A. Router switch A also connects the process controllers to server B, station A and station B, and through access switch B to server C and server D, as well as stations C and D. Shown is both a central repository 135 that stores generic data having attack scenarios/event paths including event paths and plant facility specific data 240, that are both provided to a disclosed risk engine 250. The risk engine 250 is shown generating applicable event paths with their estimated residual risk 255. Server A and station D are both shown providing the ICS facility specific data including exposures, to the risk engine 250. Although not shown, as known in the art of process control the process controllers generally connect to input/output (I/O) modules, which connect to field devices including sensors and actuators, which connect to processing equipment.

A disclosed cybersecurity hazard analysis tool generates all identified relevant event paths and their residual OT cybersecurity and process risk. This information is generally used to create graphical risk and hazard overviews, and to optionally to generate a report detailing ways the respective risks can be reduced to meet what is deemed an acceptable risk level. Selecting countermeasures and configuring site-specific safeguards results into new risk results which can be saved/exported for use in periodic cybersecurity risk reassessments. The cybersecurity hazard analysis tool application saves and imports a specific project (risk model), as such supporting analysis for multiple ICS installations from different ICS owners.

Figure 3A:
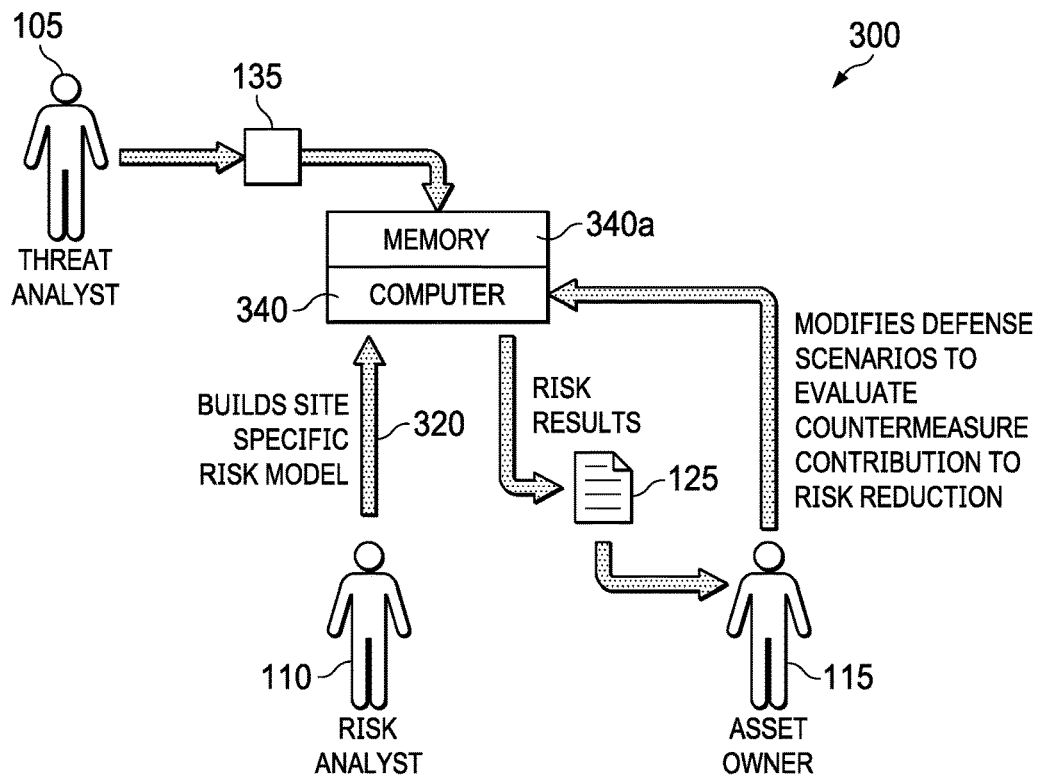
FIG. 3A depicts an example use scenario for a disclosed cybersecurity hazard analysis tool implemented as a cloud-based application.

FIG. 3A depicts an example cybersecurity hazard analysis tool use scenario implemented as a cloud-based cybersecurity hazard analysis application 300 implemented by cloud-based computer 340 including a memory 340a that can receive attack and defense scenarios (event paths) from the central repository 135. The cloud-based cybersecurity hazard analysis application 300 allows the ICS owner 115 to exercise a pre-built risk model of their ICS for various defense scenarios and new cyberattack scenarios, operating after initial set up by the risk analyst 110 without the need for assistance from the risk analyst or other risk consultant This way the ICS owner 115 can evaluate the risk reduction by selecting additional/different countermeasures, and can rerun a risk analysis with updated attack and risk scenarios. The cloud-based solution is generally available for each ICS owner with authorizations, where an ICS owner can upload a risk model 320 for their facility, modify countermeasures and run a risk estimate to obtain a modified cybersecurity risk estimation results 125.

Figure 3B:
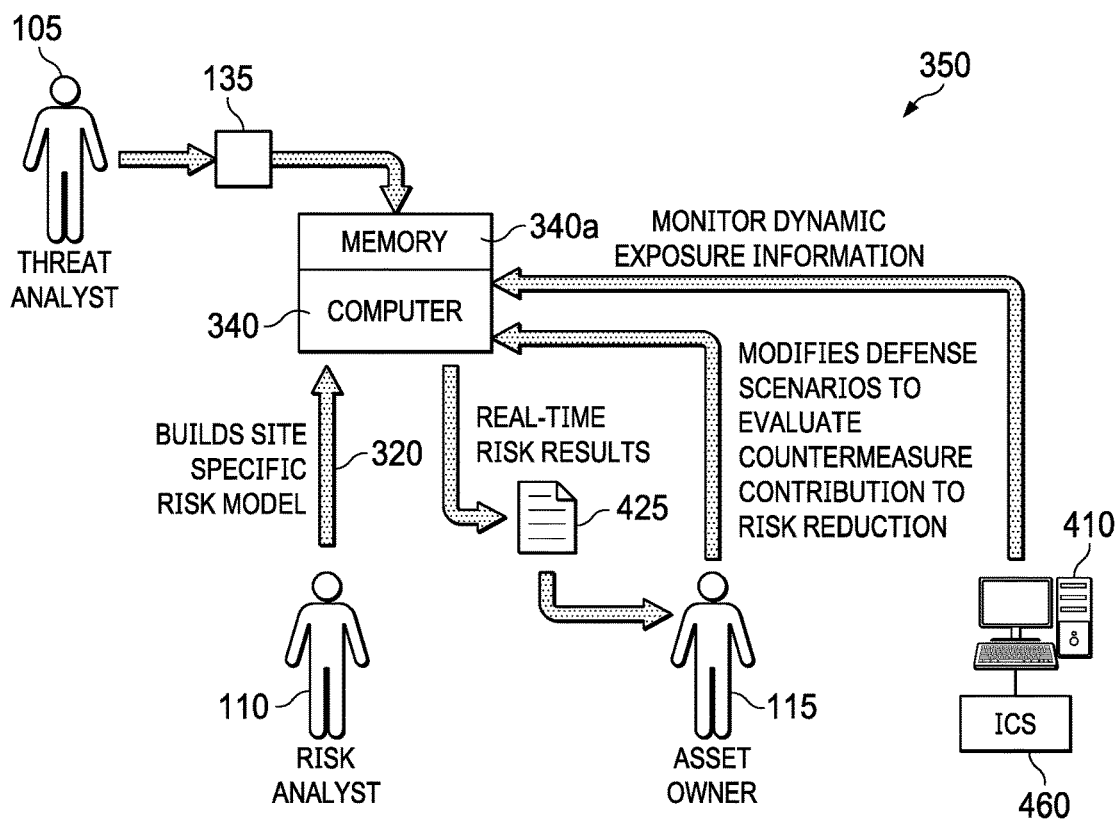
FIG. 3B depicts an example use scenario for a disclosed cybersecurity hazard analysis tool for a cloud-based application with a connection to the ICS, according to an example aspect.

FIG. 3B depicts an example cybersecurity hazard analysis tool use scenario for a cloud-based cybersecurity hazard analysis application 350 implemented by cloud-based computer 340 including a memory 340a that stores attack and defense scenarios (event paths) shown provided by a central repository 135, with a connection provided by an interface 410 to an ICS 460, according to an example aspect. The cloud-based version with a suitable cybersecure connection to the ICS allows for maintaining a real-time risk register where the different residual risk categories (groupings of event paths) are shown in real-time (updated based on actual dynamic exposure (e.g., caused by errors/lack of maintenance/policy violations) and static exposure caused by product and architecture design decisions. The cloud-based cybersecurity hazard analysis application 350 is shown generating real-time risk results 425 that are provided to the ICS owner 115. Using the cloud-based cybersecurity hazard analysis application 350 the ICS owner 115 will thus be able to rapidly spot areas to improve where the risk grows because the threat landscape changed (e.g., result from the threat analyst's updates or change in dynamic exposure), and can evaluate cybersecurity defense scenarios for their effectiveness in a site-specific manner.

Figure 4:
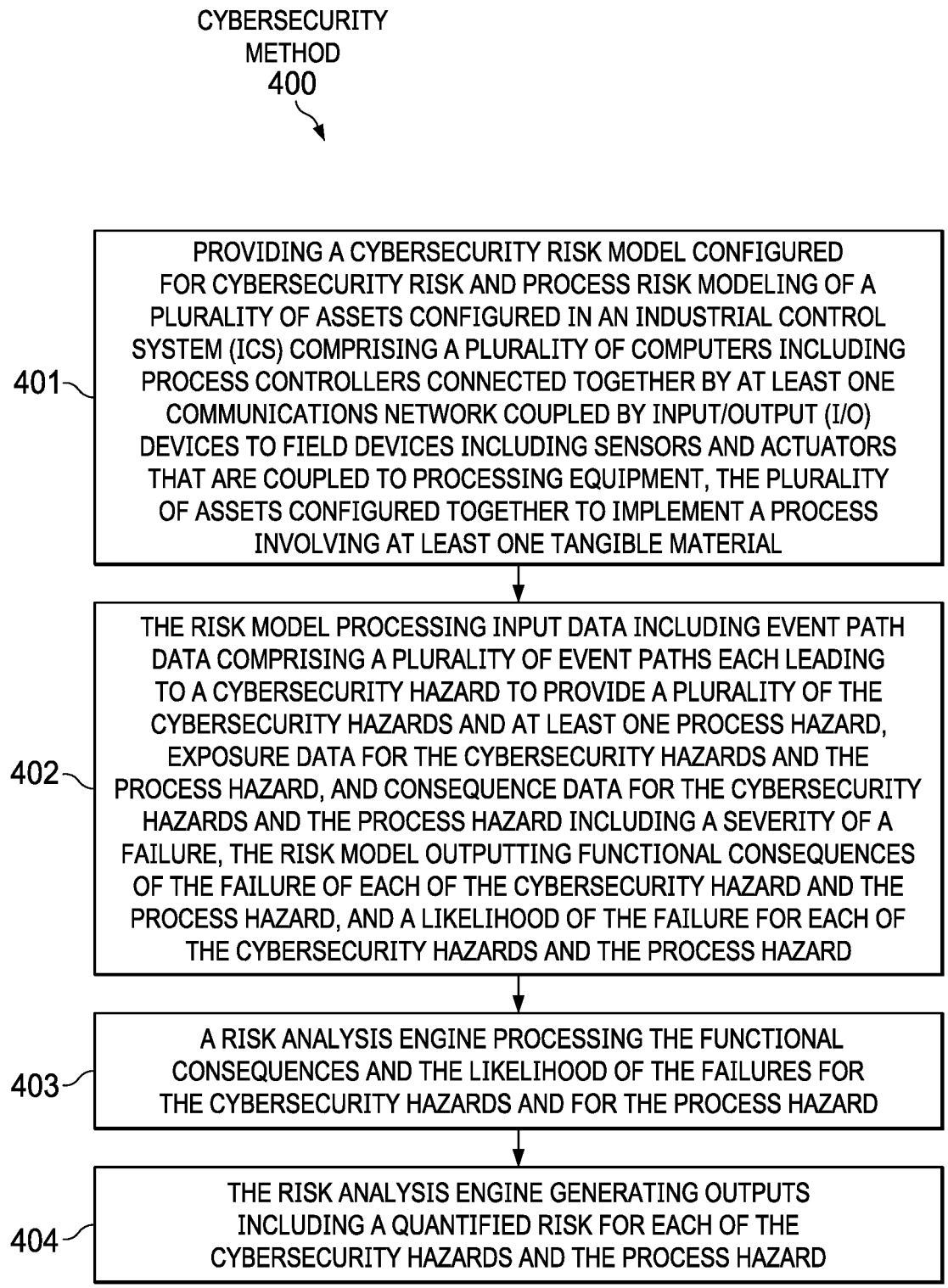
FIG. 4 shows steps in an example cybersecurity method, according to an example aspect.

FIG. 4 shows steps in an example cybersecurity method 400, according to an example aspect. Step 401 comprises providing a cybersecurity risk model configured for cybersecurity risk and process risk modeling of a plurality of assets configured a ICS comprising a plurality of computers including process controllers connected together by at least one communications network coupled by I/O devices to field devices including sensors and actuators that are coupled to processing equipment, the plurality of assets configured together to implement a process involving at least one tangible material. Step 402 comprises the risk model processing input data including event path data comprising a plurality of event paths each leading to a cybersecurity hazard to provide a plurality of the cybersecurity hazards and at least one process hazard, exposure data for the cybersecurity hazards and the process hazard, and consequence data for the cybersecurity hazards and the process hazard including a severity of a failure, the risk model outputting functional consequences of the failure of each of the cybersecurity hazard and the process hazard, and a likelihood of the failure for each of the cybersecurity hazards and the process hazard. Step 403 comprises a risk analysis engine processing the functional consequences and the likelihood of the failures for the cybersecurity hazards and for the process hazard. Step 404 comprises the risk analysis engine generating outputs including a quantified risk for each of the cybersecurity hazards and the process hazard.

For the disclosed cybersecurity hazard analysis tool, the risk model is generally always "online" to monitor the real-time cybersecurity and process risk. The ICS-owner 115 is capable of creating a copy and running the disclosed risk engine for a copy on demand in parallel with the online risk model to evaluate any changes. The ICS owner 115 can initiate a new upload to replace the risk model running in real-time mode with a modified version of the risk model. The risk analysis engine generally comprises the following three data layers described below:

1. A top layer containing the event paths for all supported assets and channels in the ICS. The top layer is a data/information repository maintained and updated for new ICS functions, new ICS devices, new protocols (channels), new attack scenarios providing new event paths, new vulnerabilities, new countermeasures, and changes in effectiveness of countermeasures.

2. From the information in the top layer, a risk analyst (as noted above is generally an individual), builds a risk model that represents the ICS as it is installed at a specific ICS owner site/location. This is done by selecting the appropriate functions installed, the assets comprising equipment/devices installed, and protocols (channels) used. Additionally, the countermeasures implemented or to be implemented by the ICS owner are selected. This action copies all the relevant event paths into the repository representing the risk model. Apart from selecting assets and channel's exposure data for these assets and channels is configured, data such as the connectivity of the asset, the complexity of the asset, the resilience of a channel, and the accessibility of the asset. Apart from this, the risk model receives for each event path the initiating event frequency and for each countermeasure a risk reduction factor based on control effectiveness, control reliability, and detection effectiveness.

Each consequence is generally manually assigned to a failure mode by the threat analyst, and the risk analyst manually assigns an ICS owner/installation specific severity score for the failure mode. The risk analyst can build safeguards that either reduce the severity of a consequence or disable the consequence. Based upon this information a residual risk is automatically estimated for each event path and stored together with the event path (generally including enabled countermeasures and configured safeguards) in the results repository for analysis, and for creating a risk register.

3. The third data layer is the results repository. Data in this results repository is used for reporting on risk based on grouping the event paths (attack scenarios), determining the highest risk, and determining the cybersecurity hazards (grouping of event paths based upon a common factor, e.g., threat actor, threat action, consequence, failure mode, risk category, and others).

The risk model is generally specific for one project (installation at a specific site/location) and can be exported and imported so different analysis can be made and results can be compared. The risk model can be imported at a later time for a periodic reassessment and updated for the latest event paths and countermeasure data. New assets and channels can be added, changes made to implemented countermeasures, and safeguards in order to run a new risk analysis. The result repository is in the form of a database that allows for queries to group the results into hazards and create a graphic risk representation, such as through risk assessment matrices, security barrier diagrams, bow-tie charts, and other risk communication diagrams.

Figure 5:
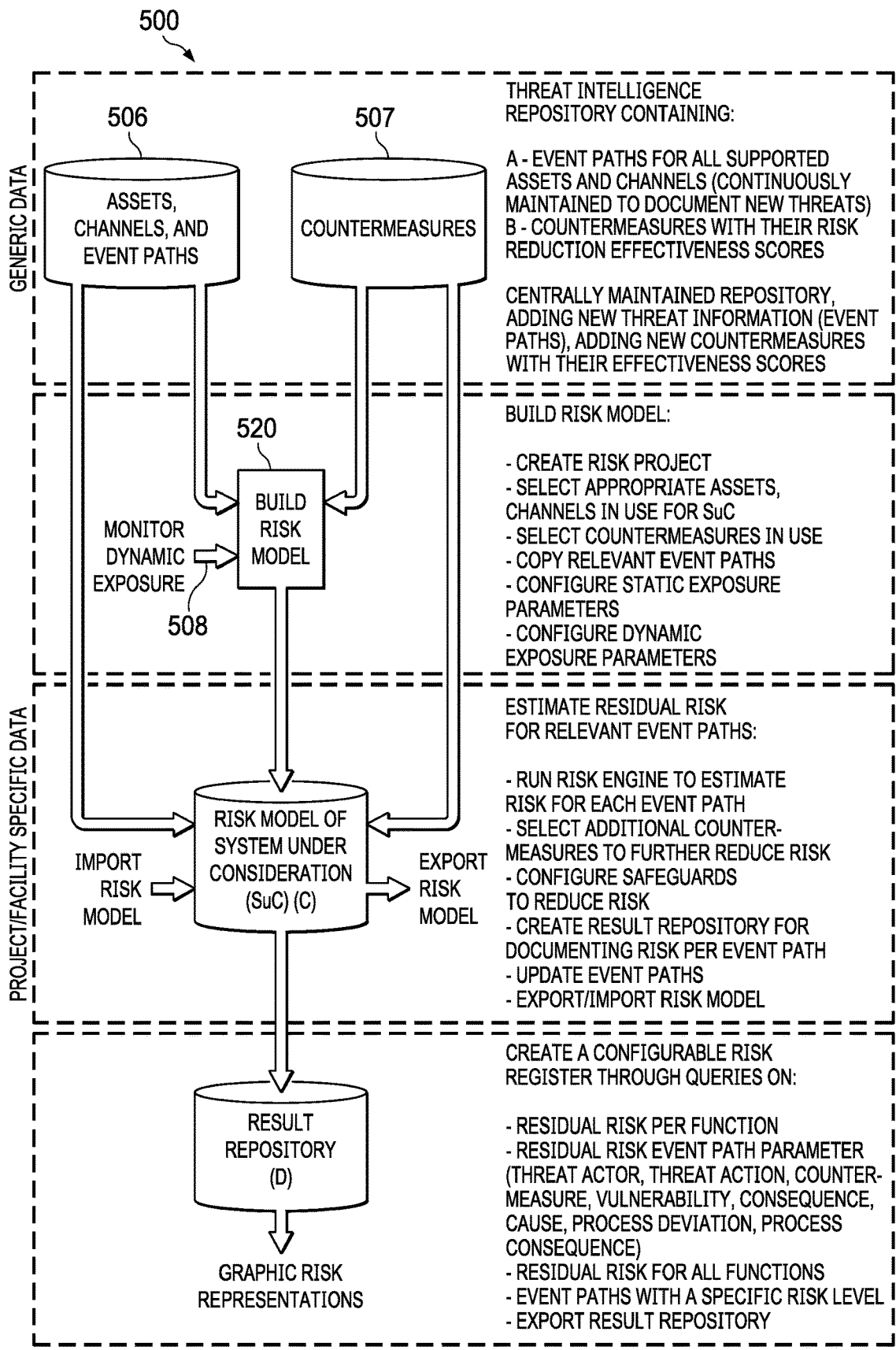
FIG. 5 is an example architecture for a disclosed cybersecurity risk engine.

FIG. 5 is an example architecture 500 for a disclosed risk engine that receives assets, channels, and event paths (attack scenarios) 506, countermeasures 507, and dynamic exposure data 508 which generates a risk model 520. The concept of risk analysis is analyzing risk for what is referred to herein as an event path (attack scenario), and a cybersecurity hazard (grouping of event paths/attack scenarios with a common objective). Event paths are used to estimate cybersecurity risk (as a risk priority number), process risk (as a risk priority number), and mission/business risk (as loss-based risk). Process consequences are assigned a business impact (a loss) to obtain business/mission risk. This Disclosure as described above relative to FIG. 4 includes a cybersecurity method for correlating cybersecurity hazards, attack scenarios and cybersecurity risk to process risk priority numbers and loss-based business risk resulting from a security failure in the ICS. Process risk (risk priority number) and business/mission risk (as loss-based risk) as a consequence of malicious functional deviations result from a cyberattack completing at least one event path on the ICS' functions.

Figure 6:
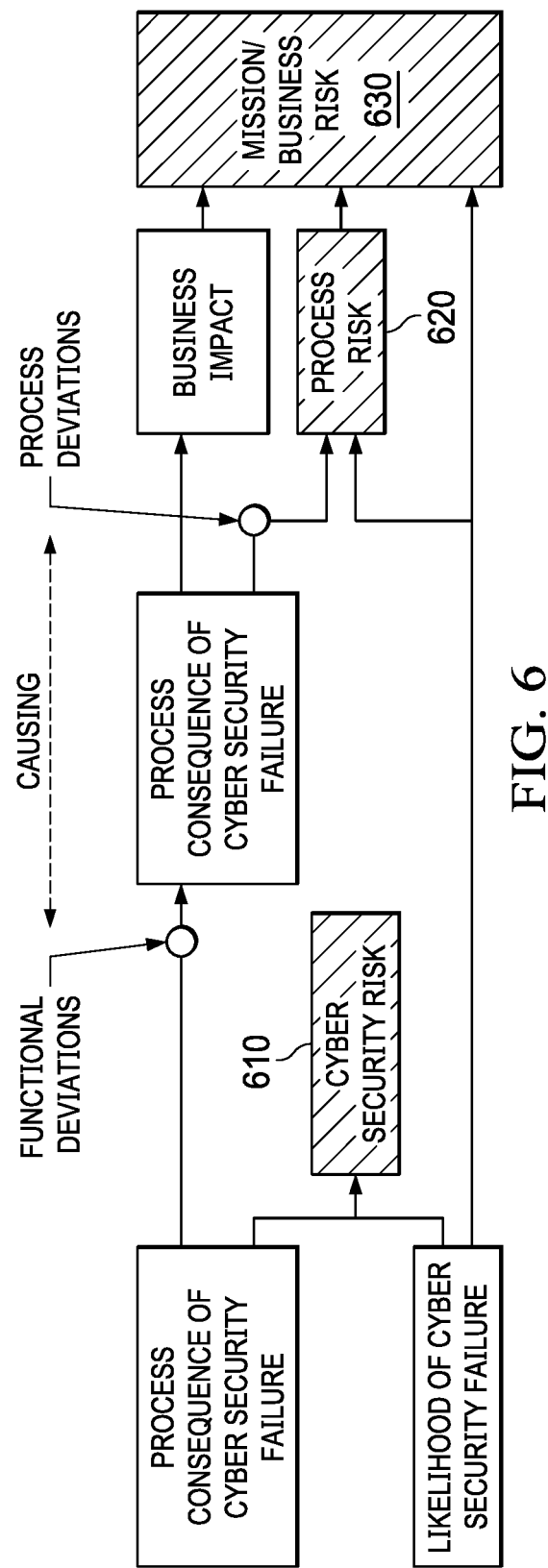
FIG. 6 depicts cybersecurity risk, process risk, and mission/business risk.

FIG. 6 depicts cybersecurity risk 610, process risk 620, and mission/business risk 630. An ICS is known to comprise a collection of functions to control and automate a production process, such as can be found in chemical plants, refineries, oil and gas in general, as well as power generation. Such an ICS generally contains many different functions (sub-systems) generally provided by multiple equipment vendors, including a combination of equipment and software. Examples of such functions are the following:

BPCS standing for a Basic Process Control System, is a collection of servers, client/operator stations, and devices such as process controllers and network equipment, that is communicatively coupled together by a communications network, such as an Ethernet network (confirm) in one particular arrangement. The BPCS functions to control the production process.

SIS, standing for a Safety Instrumented System, is a collection of servers, client/operator stations, and devices such as safety controllers and network equipment coupled together by a communications network, such as an Ethernet network in one particular arrangement. The SIS functions to safeguard the production process, and it begins to act at the moment the production process is no longer in a safe state or on demand by a process operator.

MMS, standing for a Machine Monitoring System, is a collection of servers, client/operator stations, and devices such as process controllers and network equipment coupled together by a communications network, such as an Ethernet network in one particular arrangement. The MMS function monitors equipment and performs a diagnosis of its performance. For example, for the monitoring of vibrations, such as vibrations of a turbine.

The above lists just a small number of systems that are generally within an ICS. The task for a disclosed cybersecurity hazard analysis tool is to estimate the cybersecurity risk for these functions, and the ICS as a total. There are two elements that are recognized which induce the cybersecurity risk comprising assets to comprise the software function, or system/devices, and the channels present the data flow between the respective assets making use of communication protocol(s).

The task for disclosed cybersecurity hazard analysis tools is generally to identify the hazard(s) as potential consequence of a cyberattack, to estimate the residual risk after implementing countermeasures and safeguards; to account for static exposure (as result from design, e.g. network segmentation, the use of portable media) and dynamic exposure (as result of human activity or time, e.g., not installing security patches, use of weak passwords), and to account for countermeasure effectiveness respect to risk reduction. Other tasks for disclosed cybersecurity hazard analysis tools include to compare the influence of different threat actors on the risk; group types of losses and their risk; and to allow for investigating the influence of multiple countermeasures/safeguards on the residual risk to group the risk based on threat actor capabilities, threat actions, vulnerabilities, consequences/failure modes, and risk reduction contribution.

The assets and channels (communication protocols) when cyber-protected by cyber-protection countermeasures reduce the likelihood of a cyber-incident, and safeguards reduce the overall consequence severity of a cyber incident, are both used with disclosed aspects. These countermeasures and safeguards can reduce the risk to an acceptable level. (See FIG. 6 described above).

Figure 7A:
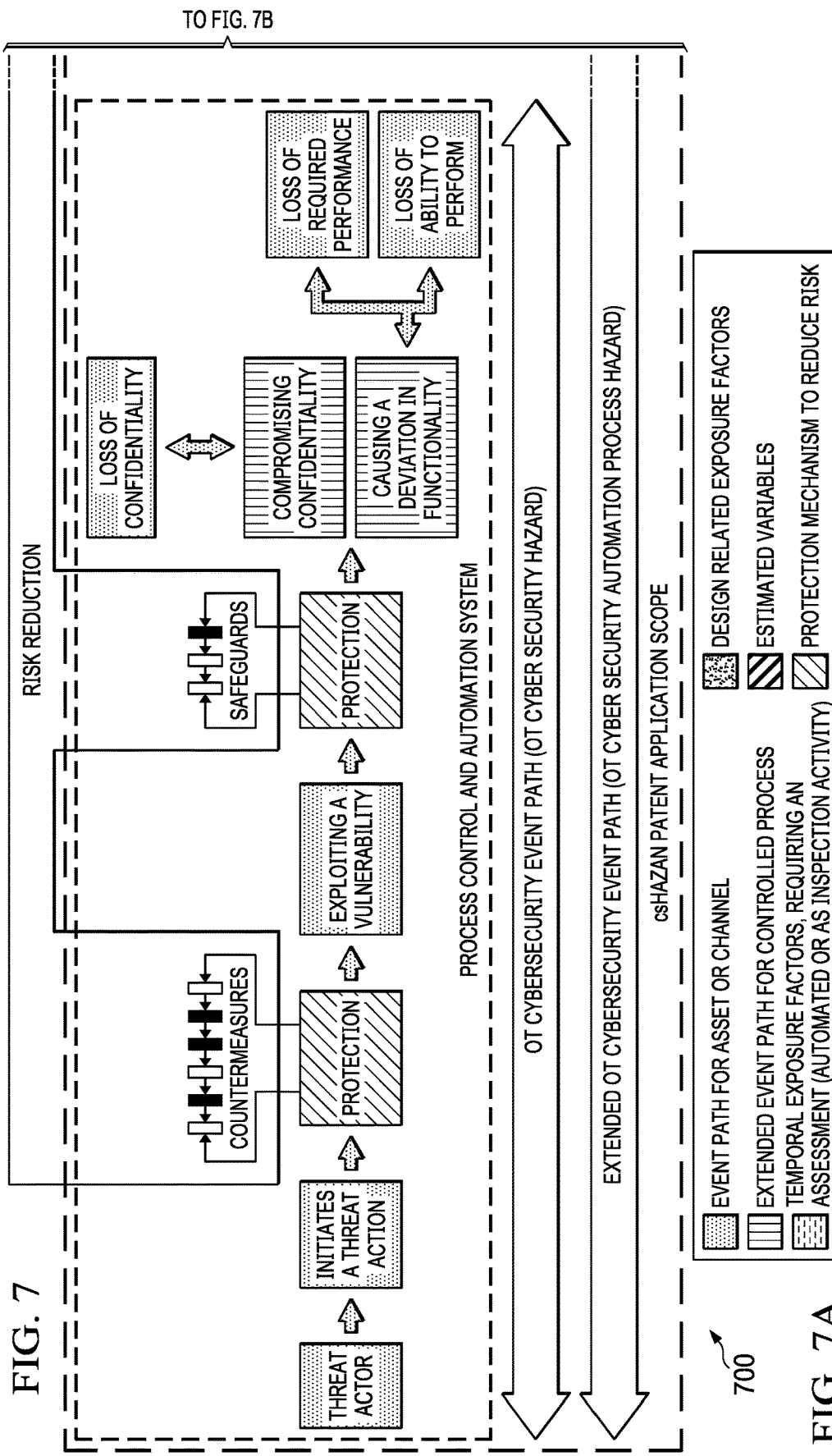

One disclosed aspect comprises a method that defines the event path between the threat actor's initial threat action, the consequence for the ICS function (OT cybersecurity hazard), and the process deviation and consequence for the physical system (OT cybersecurity process hazard) together with a method to estimate risk for each event path and hazard. FIGS. 7A and 7B depict an example event path 700.

EXAMPLES

Disclosed aspects are further illustrated by the following specific Examples, which should not be construed as limiting the scope or content of this Disclosure in any way.

A nation sponsored organization (threat actor) gains unauthorized access into the communications network utilized by the BPCS (threat action) by using compromised access credentials because of the absence of two-factor authentication thus exploiting a vulnerability in the BPCS network. The threat actor modifies the range of a level measurement for a tank, which represents a functional deviation (consequence), and results in a loss of the required performance.

This event path is an example of an OT cybersecurity event path, which can be extended with the consequence of the modified range for the level measurement to the production process (extended event path). The modified level range (cause) results in a too high a liquid level in the tank (process deviation) with as a consequence causing a loss of containment by the overfilling of the tank (a process consequence).

The process risk for the extended path uses the likelihood of the cybersecurity risk and the consequence severity of the process consequence. (See FIG. 5 described above). Cybersecurity risk and process risk are what can be called risk priority numbers, a value allowing one to rank the various risks. Business risk is based upon a business loss, and as such would be the actual risk value.

Features provided in this disclosed concept include the use of event paths to describe attack scenarios, including multiple countermeasures and safeguards, to estimate the cybersecurity risk (risk priority number), the use of extended event paths to determine process risk (risk priority number) and business risk (based on business loss). Also, the use of initiating event frequencies and risk reduction factors for estimating cybersecurity risk and cybersecurity induced process risk (explained below), and the use of risk reduction factors for countermeasures based upon a probability of failure on demand (PFD) as a function of prevention effectiveness and intrusion detection effectiveness (IDE) which is further explained below. The risk model estimates cybersecurity risk for ICS taking into account multiple countermeasures and safeguards, and the use of exportable and importable risk models that allow for comparison of different defense strategies.

Figure 8A:
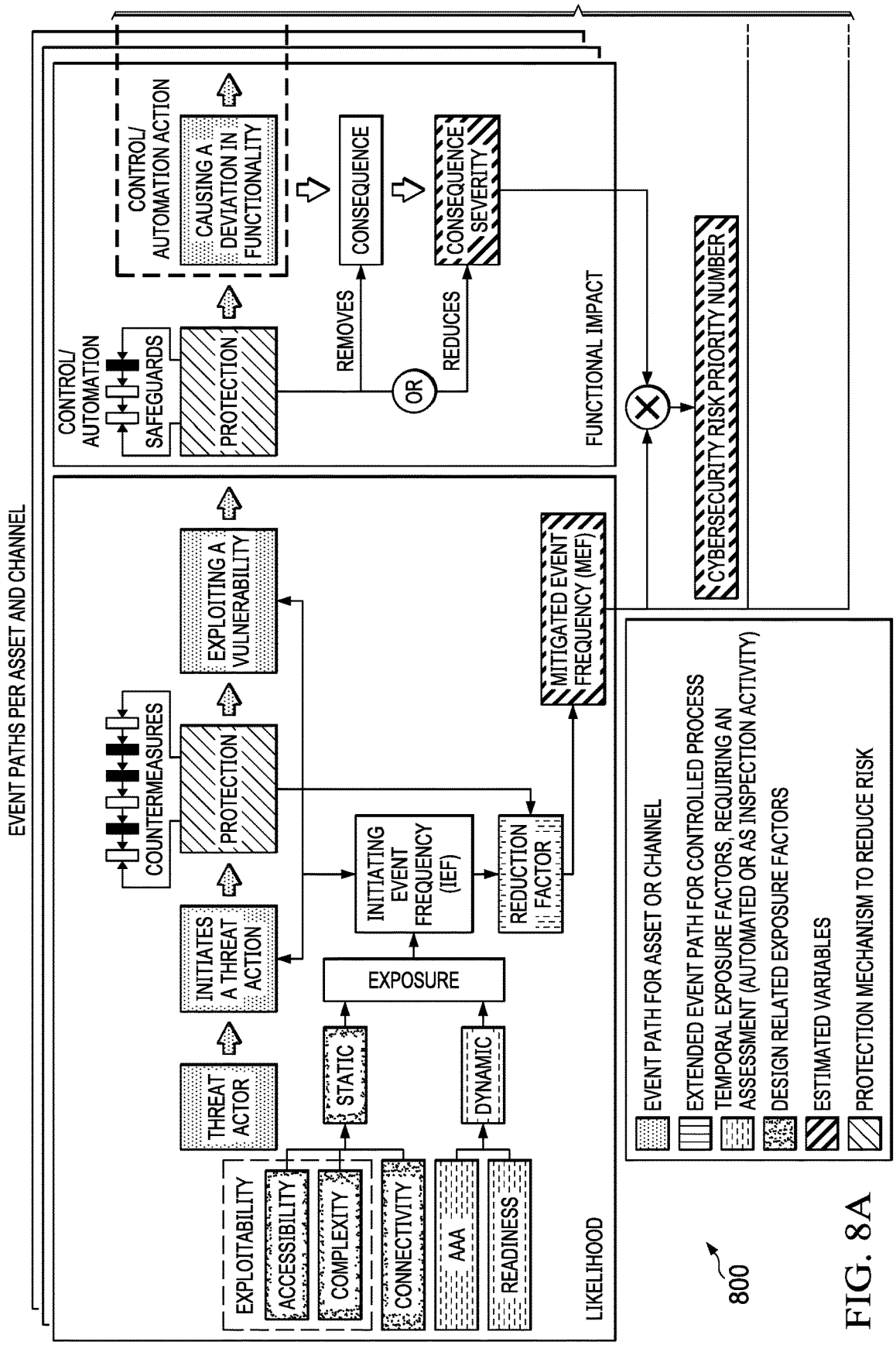
FIGS. 8A and 8B depict an example event path as processed by a disclosed cybersecurity risk engine after adding ICS-specific data.
Figure 8B:
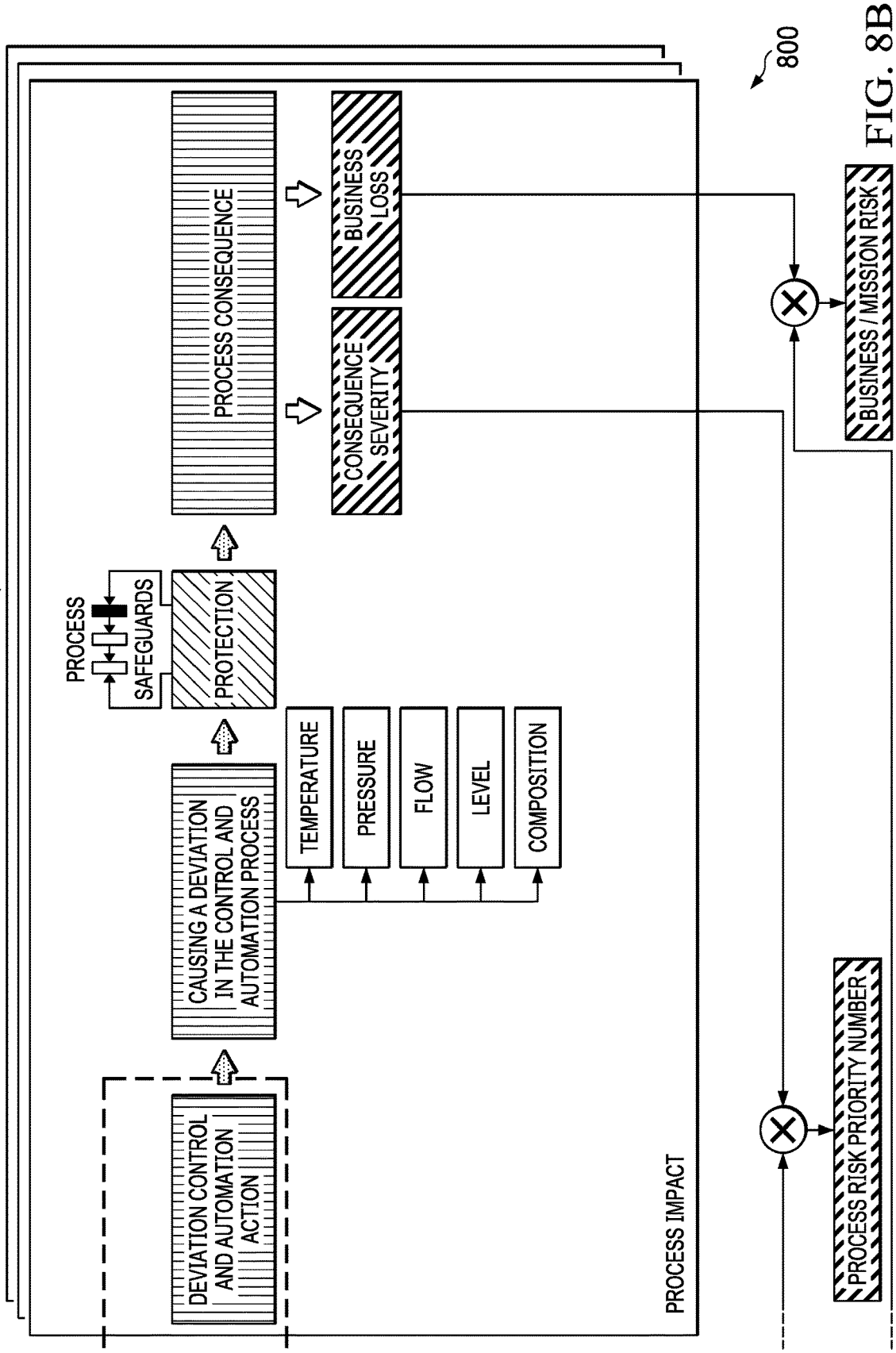

FIGS. 8A and 8B depict an example risk engine event path 800. Cybersecurity risk is reflected in a risk priority number when there is no loss specified, where process risk and business risk (in terms of loss) are a function of the likelihood of the cybersecurity event. The point where the cybersecurity event "meets" the resulting process event is the functional impact. At this point the deviation of the ICS causes a deviation in the ICS' action resulting in a process impact (e.g., too high a temperature, too low a product level, or a reversal of the flow).

The combination of the threat action and vulnerability have an IEF assigned, where this initiating event frequency varies for each threat actor. The capabilities, opportunity and available resources determine if a threat actor can execute the threat action, therefore there is a difference per threat actor. The exposure either increases the initiating event frequency if exposure of the vulnerability is higher than nominal, or reduces initiating event frequency if exposure of the vulnerability is lower than nominal.

Figure 9:
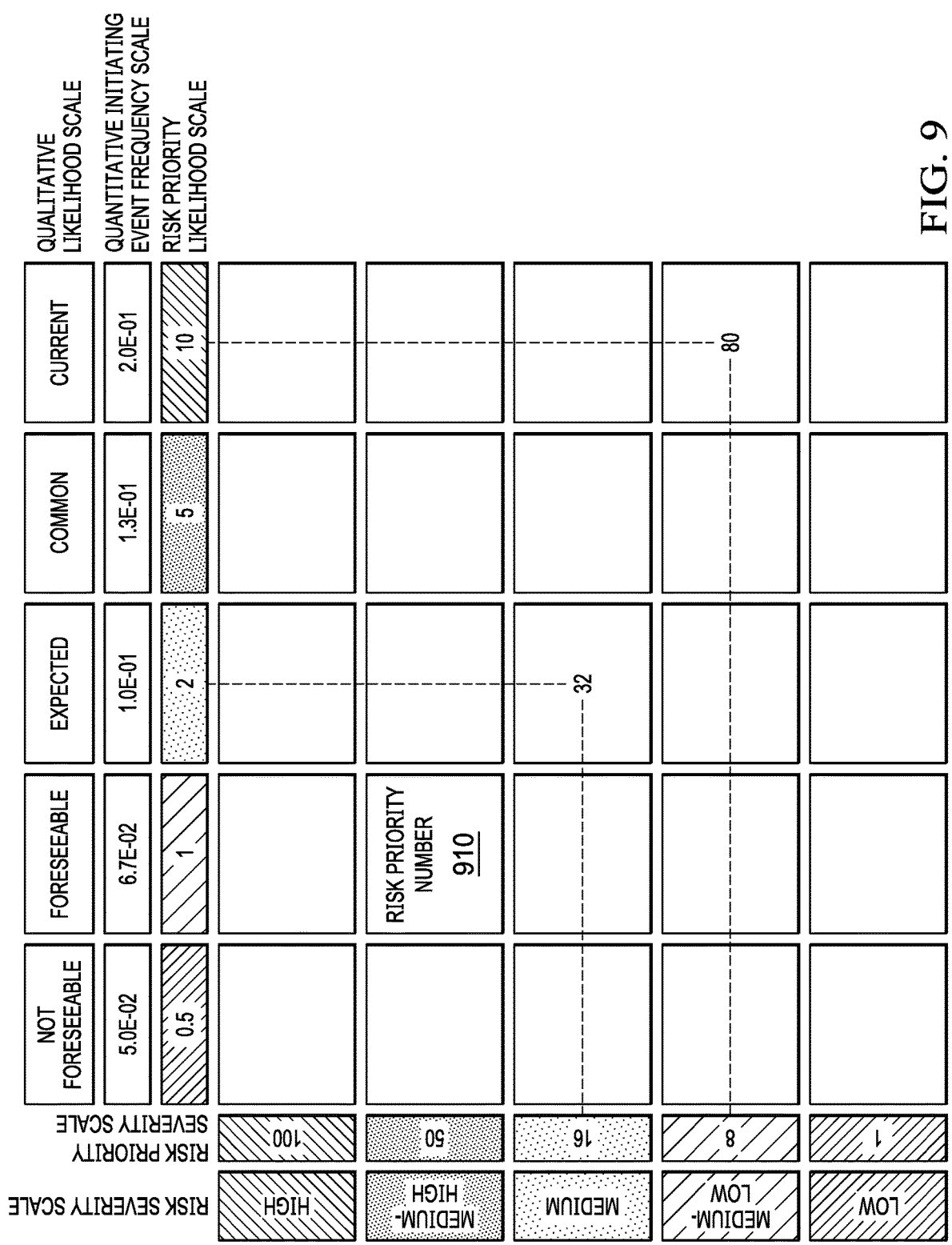
FIG. 9 depicts configurable risk scales for likelihood and severity for estimating a risk priority number.

Countermeasures provide a risk reduction factor (RRF) that reduces the IEF. The mitigated event frequency (MEF) is the product of IEF and RRF. The inverse of the MEF, 1/MEF, provides a value for a likelihood for the occurrence of a given event. All inputs to construct the model can be qualitative values. These qualitative values can be automatically converted into quantitative values (using configurable ranges, shown as a risk priority number 910) for estimation, which after estimation or converted back into qualitative values for reporting on risk. FIG. 9 shows an example matrix 900 having configurable risk scales for likelihood and the severity for estimating a risk priority number for scales that may be used, where a risk analyst can determine the scale values for event frequency and risk priority scales. The risk scales can either be logarithmic or linear, and risk estimation (either addition or multiplication) is adapted for this function.

The example matrix 900 shown in FIG. 9 can also be used for determining whether a risk is acceptable, tolerable, or unacceptable. In principle it is possible to have a minimum of 3 risk levels, up to a maximum of 9 risk levels in this example matrix 900 that is a 5×5 matrix. For each risk level the action and criteria can be defined.

Figure 10:
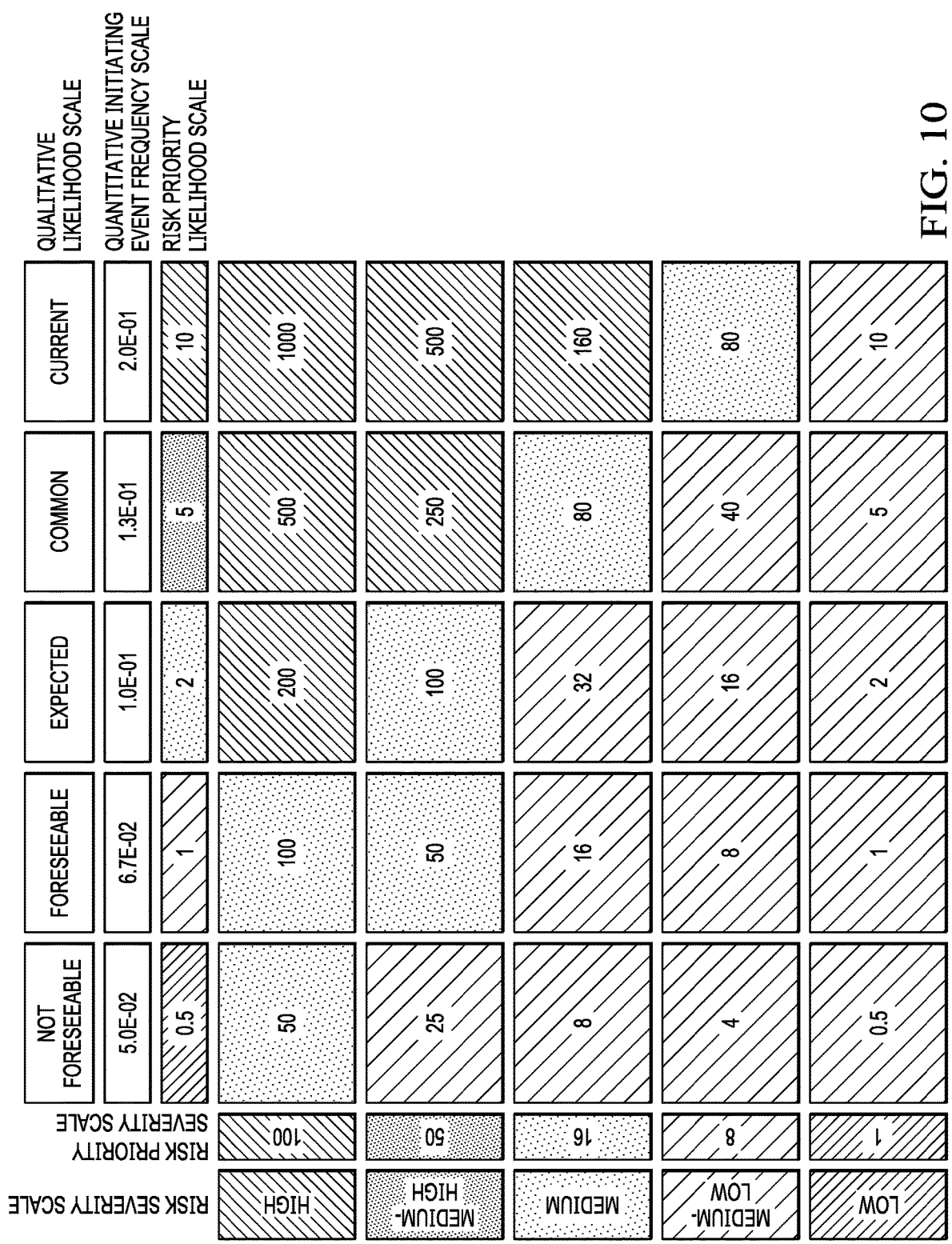
FIG. 10 is an example of a three-risk level scale including risk tolerance definitions.

FIG. 10 is an example of a three-risk level scale 1000 (that can be color-coded, such as using the color green (for the lowest risk), yellow (e.g., for a medium risk), red (e.g., for the highest risk)). Through countermeasures it is possible to reduce the likelihood of an event path, and through safeguards one can reduce the consequence severity of the event path. The disclosed risk engine estimates the coordinates in the risk assessment matrix for the residual risk priority number. For example, if the risk priority number is 250, by adding (enabling) countermeasures (for example adding an antivirus engine) one can shift the risk priority number to the left (thus lower, in the direction of 100, 50, 25 in the FIG. 10 example) and shift it downward for example to 32 if one adds a safeguard (for example hardwiring a process connection between a process controller and a PLC) that prevents consequences with a higher severity to occur.

Figure 11:
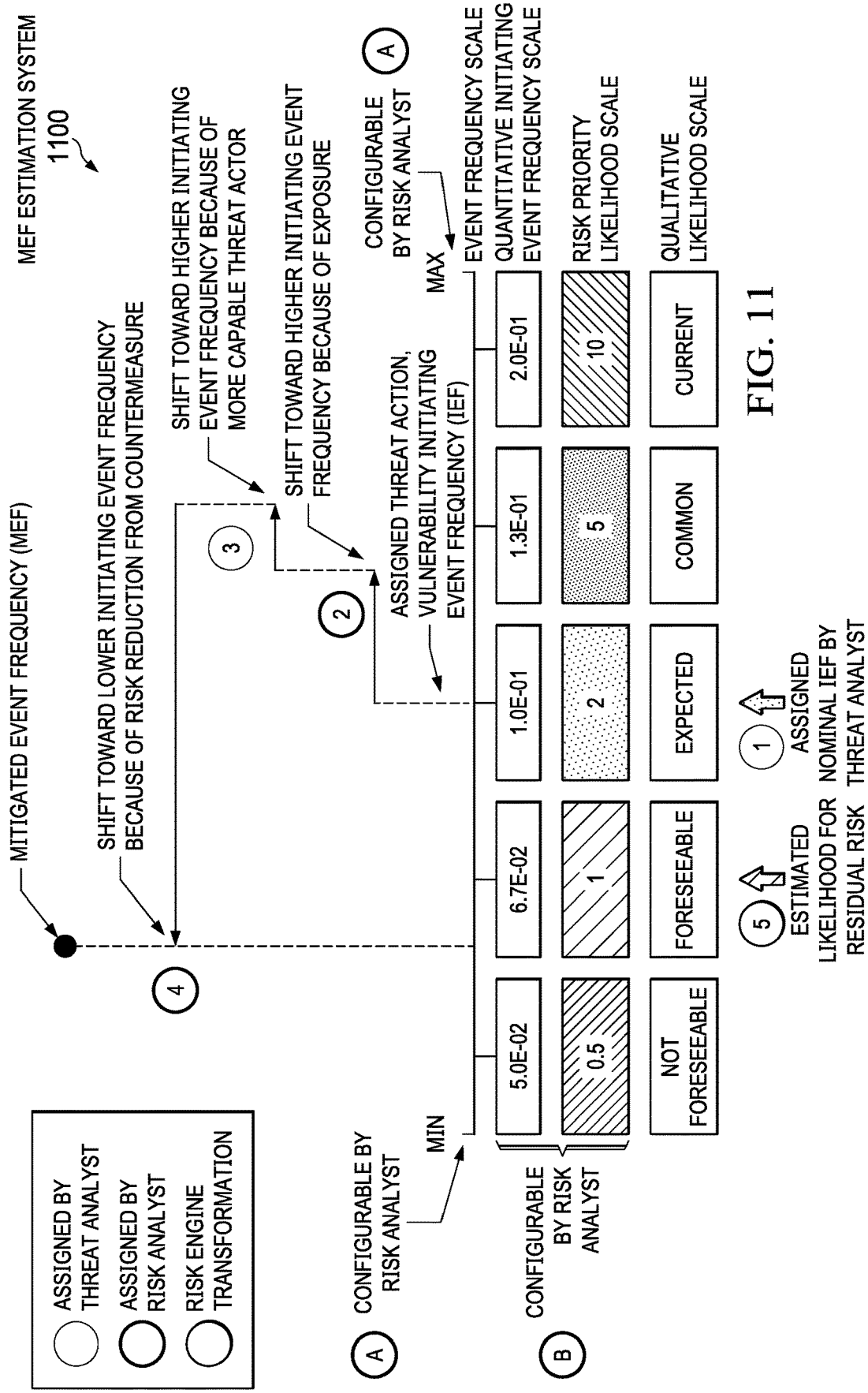
FIG. 11 depicts the influence of the various configurable parameters on an initiating event frequency (IEF) and factors influencing the IEF to estimate a mitigated event frequency (MEF), and a probability for the event path.

The influence of the various configurable parameters on the IEF and factors influencing the IEF can be used to estimate MEF shown as MEF estimation system 1100 in the FIG. 11 as an example. For example, at the project level, so the configurable scale is applied to all event paths in a project, the risk analyst can modify the initiating event range minimum and maximum value shown as (A).

The threat analyst (so application-wide for all risk estimates over all systems) assigns values for the selections to the IEF and risk priority likelihood scales shown as (B). The threat analyst (so application-wide for all risk estimates over all systems) assigns a nominal IEF for a specific threat action/vulnerability combination for the event path (1). The risk analyst (project specific) then scores various variables that define static and dynamic exposure compensation resulting in a modification of the IEF. If the exposure is higher than nominal toward a higher IEF, if lower than nominal toward a lower IEF. (2). The threat analyst has configured (so application-wide for all risk estimates over all systems) which threat actors can execute the event path, and has assigned a factor that modifies the IEF. For more capable threat actors with the opportunity and resources to execute the attack toward a higher IEF, and for less capable threat actors, or not having opportunity or resources, toward a lower IEF. (3)

The risk analyst (project specific) selected a set of countermeasures that were implemented or need to be assessed. This set of countermeasures results in a risk reduction factor that reduces the IEF with as result the MEF. (4) The risk engine converts the MEF into a quantitative risk priority likelihood scale and a qualitative likelihood value (5). The risk reduction factor depends on the multiplication of the countermeasure's probability of failure on demand (PFD) score for each countermeasure applied. The PFD is a function of prevention effectiveness (risk control reliability, risk control effectiveness), and intrusion detection effectiveness. Assignments made by the threat analyst result in a prevention effectiveness score and an intrusion detection effectiveness score for each countermeasure.

Figure 12:
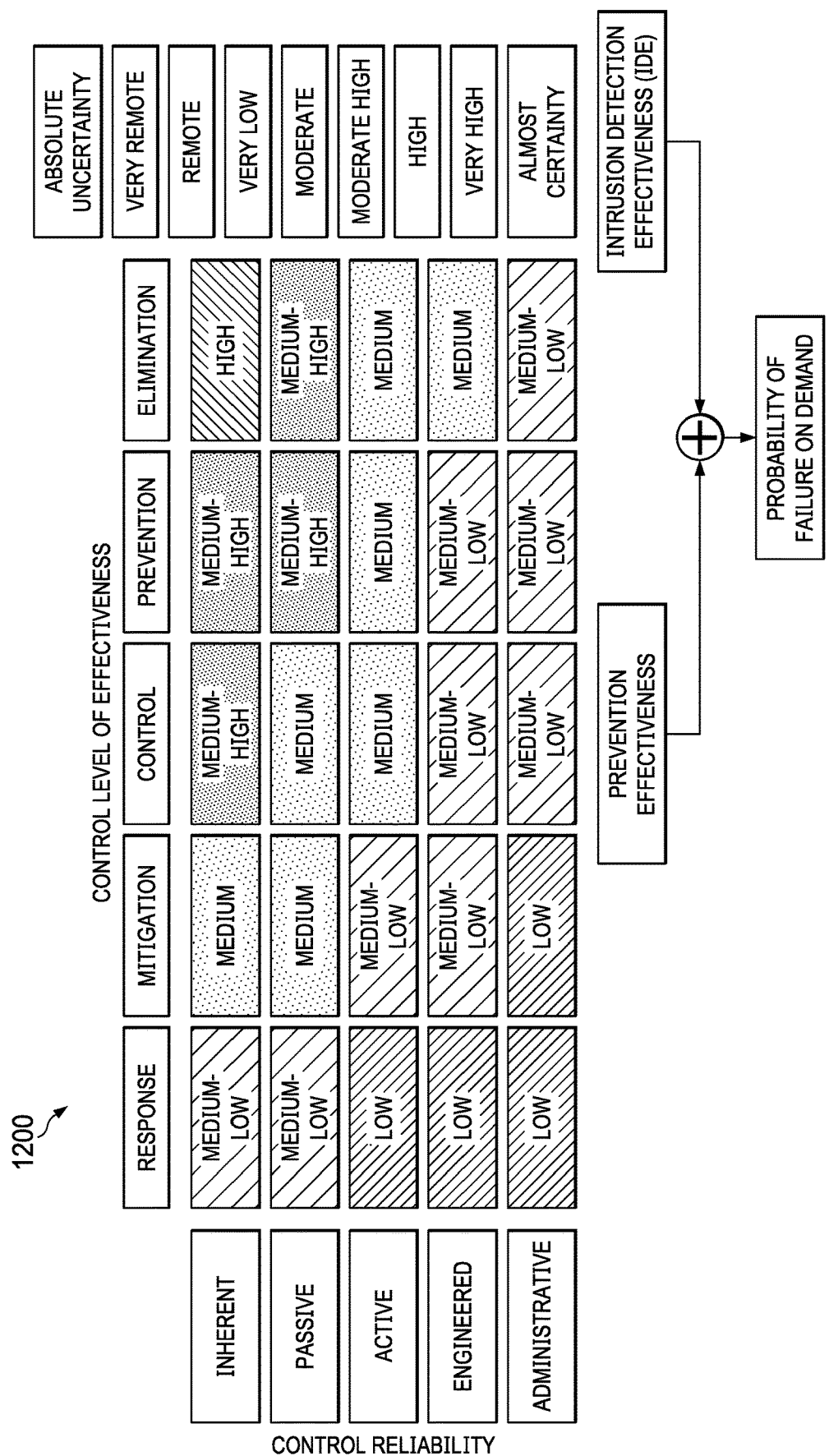
FIG. 12 is an example of how to estimate the risk reduction of a cybersecurity control expressed as the probability of failure on demand.

FIG. 12 shows an example of a data flow 1200 showing one example how to arrive at a probability of failure on demand. The risk reduction factor is PFD1×PFD2× . . . ×PFDN that results in a value between 0 and 1. A value close to 0 can indicate a very high probability that the set of selected countermeasures will stop the cybersecurity threat action against the vulnerability, and a value close to 1 can indicate that the set of countermeasures is largely ineffective.

Static exposure is based upon a number of factors that are scored per asset and channel with regard to the design. The factors for assets can include a complexity, where the more complex an asset, the more potential vulnerabilities, the higher the exposure. Accessibility, where the more accessible (no controlled, certified or authorized access) the higher the probability the asset is exploited, so the higher the exposure. Connectivity which represents a relationship between the security zone the asset resides in and the trust level of the security zone the asset connects with. Security zone trust levels can be based on the Purdue Reference Model hierarchical functional levels for manufacturing systems. For exposure the worst-case connectivity is generally used, being the connectivity connecting with a zone of the lowest trust level.

For channels, the factors can include connectivity which represents the data flow between assets in different security zones of the ICS and the trust level of the security zone these assets reside in. Security zone trust levels are based on the Purdue Reference Model hierarchical functional levels for manufacturing systems. Channel resilience which is a factor that scores resilience criteria for the channel (protocol), the more resilient, the lower the exposure. The above-described factors are scored by the risk analyst based upon the design of the ICS.

Dynamic exposure can be based upon factors including readiness being the level of having maintained all assets and risk controls. For example, having installed all security patches, having updated all antivirus signatures for an AV (Antivirus) engine, having updated the threat intelligence information of an IPS (Intrusion Prevention System) or anomaly detection system. The higher the readiness (maintenance activities have been carried out) the less exposed the asset is.

AAA stands for Authentication, Authorization, Auditing. The better these factors have been configured and maintained the better the access to the asset adheres to the concept of least privilege, the lower the exposure of any vulnerabilities will be.

Each of these factors is scored and result in a static and dynamic exposure value, which is converted in an overall exposure value. The exposure value influences the IEF. When above 1.0 the IEF is raised, and when below 1.0 the IEF is lowered. A score of 1 represents a nominal exposure for the vulnerability.

Regarding consequence, each event path has a consequence, this consequence depends on the function and the threat action. To estimate the cybersecurity and process risk it is generally needed to assign a consequence severity score for each consequence. This severity score is provided by the ICS owner because it differs per installation/production process. Because taken all functions in an ICS, and all event paths (attack scenarios) and resulting functional deviations to consider, assignment of consequence severity would likely be a very time-consuming process. Therefore, failure modes have been defined for the three main cybersecurity loss categories comprising loss of required performance, loss of ability to perform, and loss of confidentiality. The number of failure modes can grow depending on the consequences identified. The consequence severity is assigned to the failure modes defined for a specific function. For example, the failure modes for the BPCS function, and for the SIS function. Consequence severity is using the severity assignment of the failure mode that has been assigned to the consequence. This reduces the effort for the consequence analysis.

Functions are assigned a criticality (importance) level for each of the three loss categories (loss of required performance, loss of ability to perform, loss of confidentiality). This criticality level is determined by the ICS owner.

When estimating risk per function and subsequent comparing risk of different functions it is may be necessary to take the difference in criticality of the function into account.

Therefore, it becomes possible to estimate apart from a risk priority score for the function to estimate a risk priority score for the overall ICS score. For this risk priority score the consequence severity is maximized to the criticality for each of the failure modes in loss category.

While various disclosed aspects have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method, comprising:
providing a cybersecurity risk model configured for cybersecurity risk and process risk modeling of a plurality of assets configured in an industrial control system (ICS) comprising a plurality of computers including process controllers connected together by at least one communications network coupled by input/output (I/O) devices to field devices including sensors and actuators that are coupled to processing equipment, the plurality of assets configured together to implement a process involving at least one tangible material;
the risk model processing input data including event path data comprising a plurality of event paths including attack and defense scenarios, each leading to a cybersecurity hazard to provide a plurality of the cybersecurity hazards and at least one process hazard, exposure data for the cybersecurity hazards and the process hazard, and consequence data for the cybersecurity hazards and the process hazard including a severity of a failure, the risk model outputting functional consequences of the failure of each of the cybersecurity hazard and the process hazard, and a likelihood of the failure for each of the cybersecurity hazards and the process hazard, wherein the exposure data includes static exposure resulting from at least one of design or network segmentation, and dynamic exposure resulting from at least one of not installing security patches or use of weak passwords, and
a risk analysis engine processing the functional consequences and the likelihood of the failures for the cybersecurity hazards and for the process hazard, wherein the risk analysis engine further processes cybersecurity countermeasures that reduce a likelihood of a cyberattack being successful and process safeguards that reduce a severity of the cyberattack, and
wherein the risk analysis engine generates outputs including a quantified risk for each of the cybersecurity hazards and the process hazard; and
wherein at least a portion of the plurality of event paths comprise a multi-stage event path comprising a plurality of stages, and wherein the event path data comprises a threat actor executing a threat action, and wherein process cybersecurity countermeasures and process safeguards are applied to each of the plurality of stages.

2. The method of claim 1, further comprising assignment of the cybersecurity countermeasures each to an event threat action and to a vulnerability.

3. The method of claim 1, further comprising generating a report that describes at least one action that results in each of the quantified risks being mitigated.

4. The method of claim 1, further comprising generating an alert responsive to any of the quantified risks for the cybersecurity hazards or for the process hazard after being found to be above a predetermined risk level.

5. The method of claim 1, wherein the input data further comprises criteria including at least one of a risk appetite and a risk tolerance level for the cybersecurity risk and the process risk, and scale dimensions comprising a number of risk levels, initiating an event frequency scale minimum and maximum; initiating event frequency selections values, risk priority number likelihood scale values, and risk priority number severity scale values.

6. The method of claim 1, wherein the exposure data comprises connectivity, accessibility, channel resilience, and complexity as factors.

7. The method of claim 1, wherein the plurality of event paths include at least one event path between a threat actor and a functional deviation of one or more of process control and automation functions, and at least one event path that further includes a physical process deviation, a cause of the process deviation, and a consequence of the process deviation for a physical installation of the ICS or for the process.

8. A non-transitory computer readable medium containing instruction that when executed cause at least one processor device to implement:
a cybersecurity risk model configured for cybersecurity risk and process risk modeling of a plurality of assets configured in an industrial control system (ICS) comprising a plurality of computers including process controllers connected together by at least one communications network coupled by input/output (I/O) devices to field devices including sensors and actuators that are coupled to processing equipment, the plurality of assets configured together to implement a process involving at least one tangible material;
the risk model processing input data including event path data comprising a plurality of event paths including attack and defense scenarios, each leading to a cybersecurity hazard to provide a plurality of cybersecurity hazards and at least one process hazard, exposure data for the cybersecurity hazards and process hazard, and consequence data for the cybersecurity hazards and the process hazard including a severity of a failure, the risk model outputting functional consequences of the failure of each of the cybersecurity hazards and the process hazard, and a likelihood of the failure for each of the cybersecurity hazards and the process hazard, wherein the exposure data includes static exposure resulting from at least one of design or network segmentation, and dynamic exposure resulting from at least one of not installing security patches or use of weak passwords, and
a risk analysis engine processing the functional consequences and the likelihood of the failures for the cybersecurity hazards and for the process hazard, wherein the risk analysis engine further processes cybersecurity countermeasures that reduce a likelihood of a cyberattack being successful and process safeguards that reduce a severity of the cyberattack, and
wherein the risk analysis engine generates outputs including a quantified risk for each of the cybersecurity hazards and the process hazard; and
wherein at least a portion of the plurality of event paths comprise a multi-stage event path comprising a plurality of stages, and wherein the event path data comprises a threat actor executing a threat action, and wherein process cybersecurity countermeasures and process safeguards are applied to each of the plurality of stages.

9. The computer readable medium of claim 8, further comprising implementing assignment of the cybersecurity countermeasures each to an event threat action and a vulnerability.

10. The computer readable medium of claim 8, further comprising generating a report that describes at least one action that results in each of the quantified risks being mitigated.

11. The computer readable medium of claim 8, further comprising implementing generating of an alert responsive to any of the quantified risks for the cybersecurity hazards or for the process hazard after being found to be above a predetermined risk level.

12. The computer readable medium of claim 8, wherein the input data further comprises criteria including at least one of a risk appetite and a risk tolerance level for the cybersecurity risk and the process risk, and scale dimensions comprising a number of risk levels, initiating an event frequency scale minimum and maximum; initiating event frequency selections values, risk priority number likelihood scale values, and risk priority number severity scale values.

13. The computer readable medium of claim 8, wherein the exposure data comprises connectivity, accessibility, channel resilience, and complexity as factors.

14. The computer readable medium of claim 8, wherein the plurality of event paths include at least one event path between a threat actor and a functional deviation of one or more process control and automation functions, and at least one event path that further includes a physical process deviation, a cause of the process deviation, and a consequence of the process deviation for a physical installation of the ICS or for the process.

15. The computer readable medium of claim 8, wherein the cybersecurity countermeasures and the process safeguards reduce a risk to an acceptable level.

16. The computer readable medium of claim 15, further comprising investigating influence of the cybersecurity countermeasures and the process safeguards on the residual risk to group the risk based on threat actor capabilities, threat actions, vulnerabilities, consequences/failure modes, and risk reduction contribution.

\* \* \* \* \*